United States Patent [19]

Yates, Jr.

[11] 4,067,170

[45] Jan. 10, 1978

[54] TUBULAR PACKAGE FORMING APPARATUS AND METHOD

[75] Inventor: Robert V. Yates, Jr., Spartanburg, S.C.

[73] Assignee: Milliken Research Corporation, Spartanburg, S.C.

[21] Appl. No.: 715,710

[22] Filed: Aug. 19, 1976

[51] Int. Cl.² .................. B65B 57/18; B65B 41/18; B65B 9/12
[52] U.S. Cl. .................................... 53/28; 53/51; 53/78
[58] Field of Search .............. 53/28, 51, 78, 180 M, 53/182 M, 52

[56] References Cited

U.S. PATENT DOCUMENTS

| 3,546,835 | 12/1970 | Mobley | 53/28 |
| 3,925,139 | 12/1975 | Simmons | 53/78 X |

*Primary Examiner*—Robert Louis Spruill
*Attorney, Agent, or Firm*—Earle R. Marden; H. William Petry

[57] ABSTRACT

Apparatus and method to change the amount of overlap in a tubular sheet material to maintain the registration of material printed thereon when the tubular sheet of material is converted into individual tetrahedral packages and to provide an alarm system to indicate when the registration system has reached its limit of controllability.

3 Claims, 5 Drawing Figures

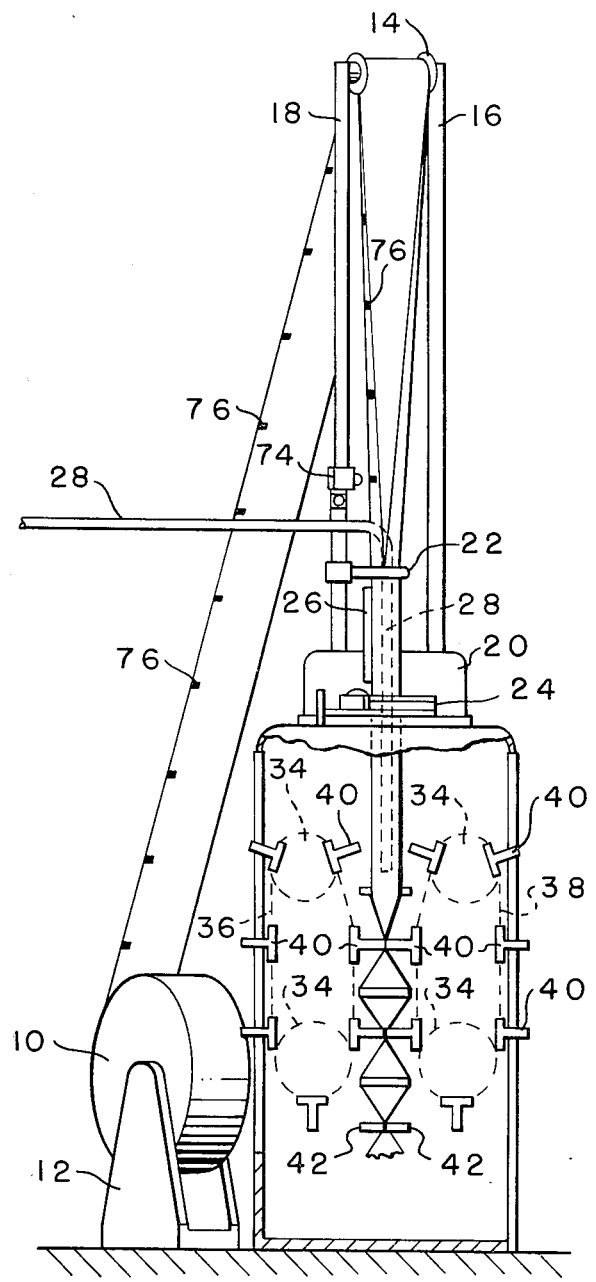
FIG.-1-

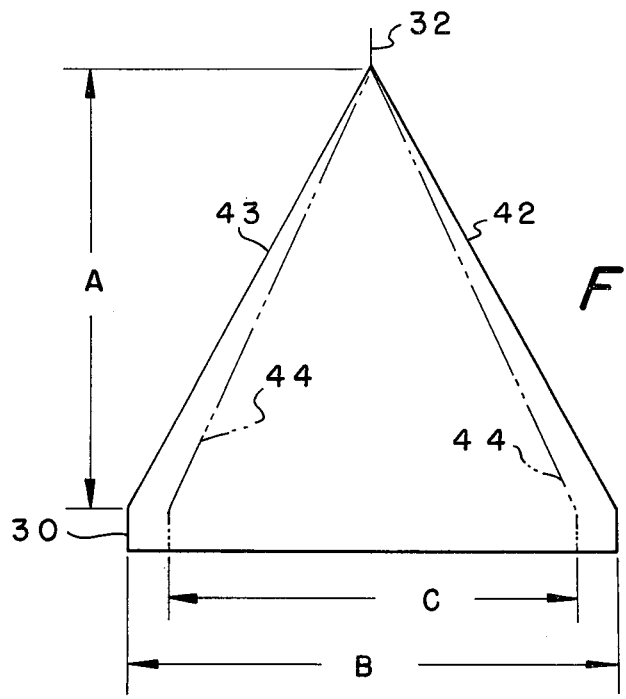
FIG.-2-
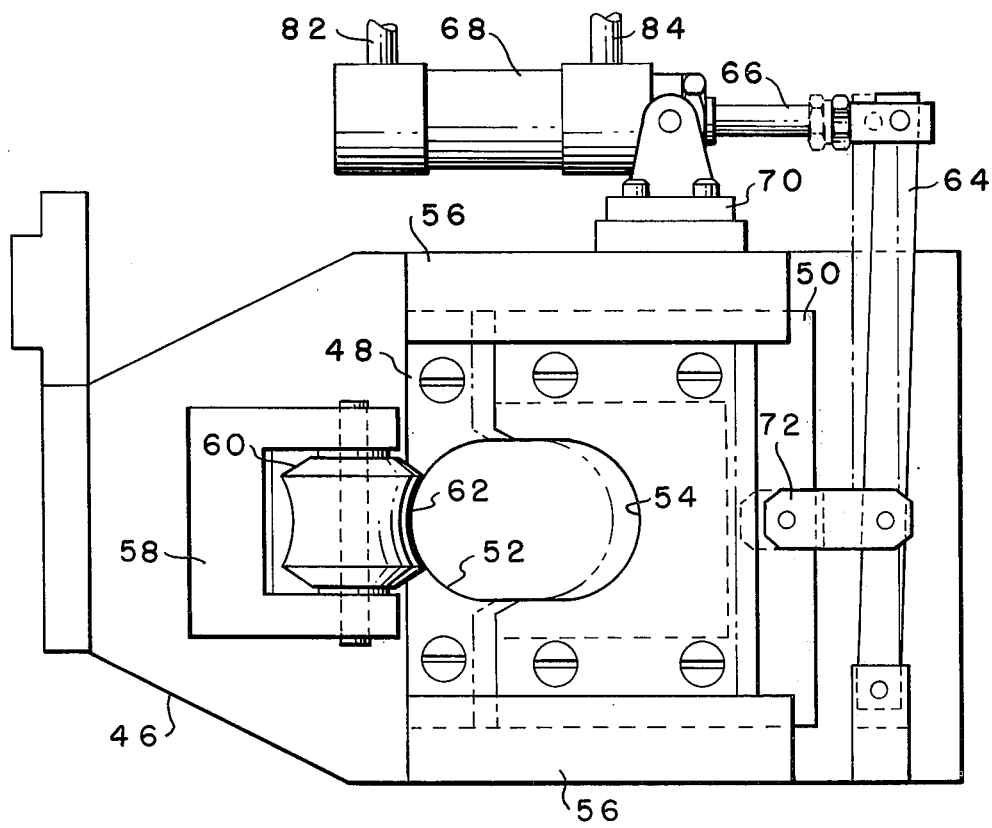
FIG.-3-

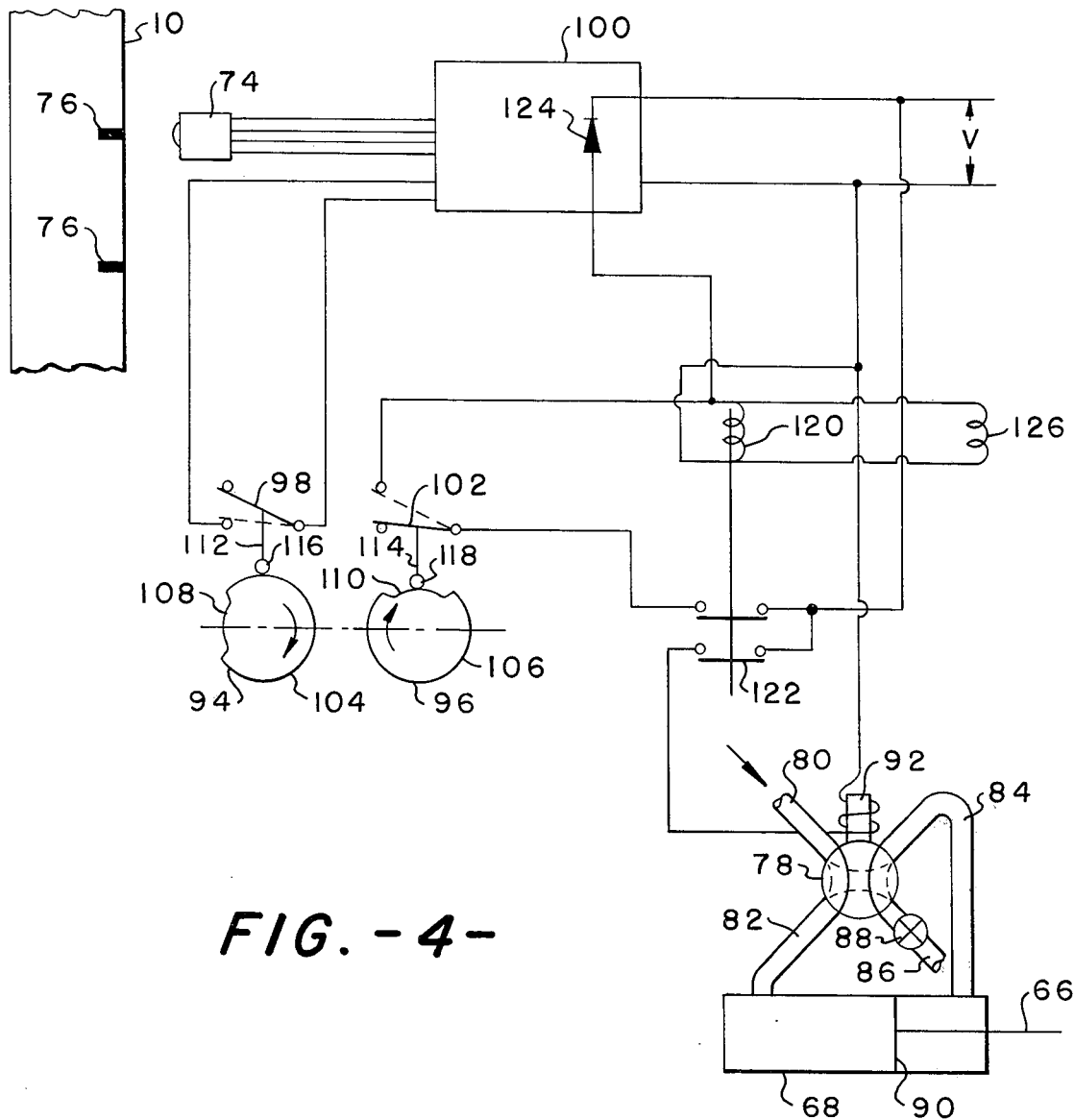
FIG.-4-

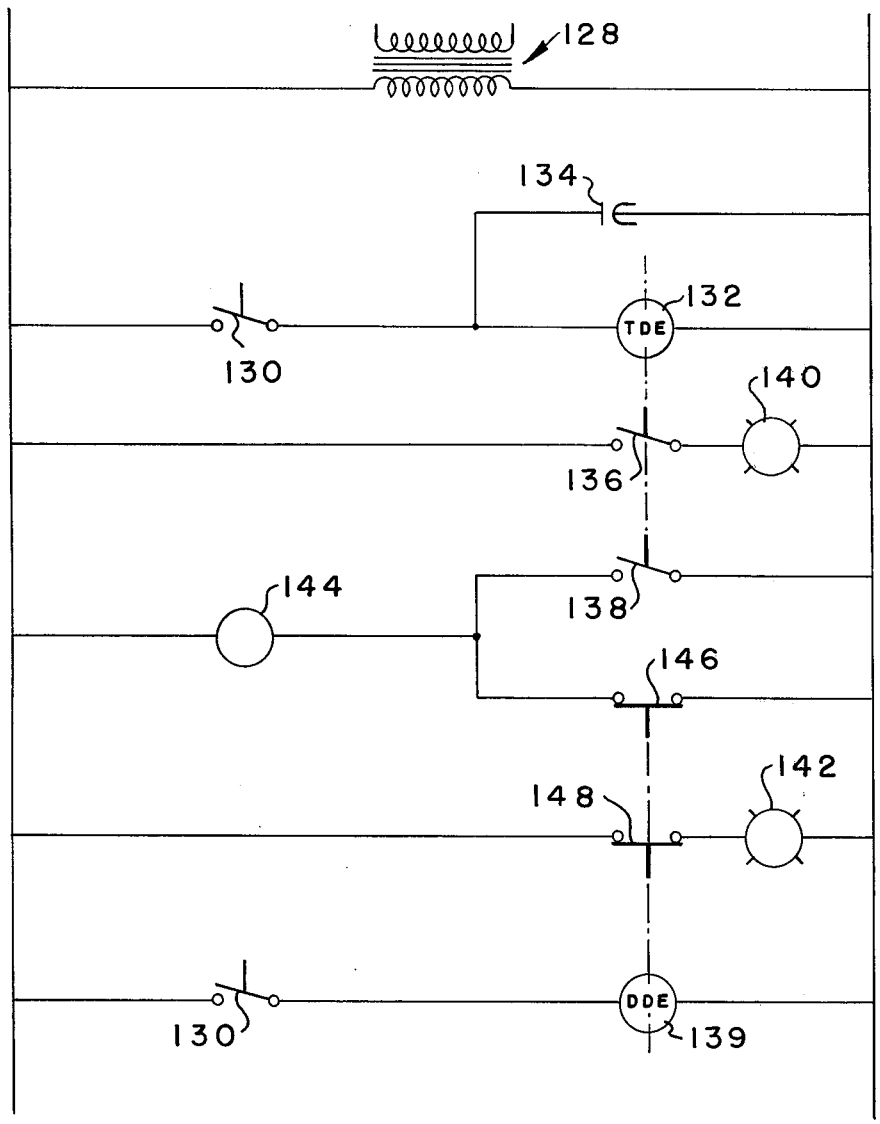
FIG.-5-

TUBULAR PACKAGE FORMING APPARATUS AND METHOD

This invention relates generally to packaging machines which produce tetrahedral shaped packages and in particular to machines which produce tetrahedrons by the use of a continuous uniform advancing mechanism to advance the web of material to be formed into packages.

There are several types of machines commercially available that produce tetrahedron shaped packages. One type of such machine is one that uses a reciprocating motion to advance the web of material to be made into packages. Another type of machine is one that employs a continuous uniform advancing mechanism to advance a web of packaging material. In both types of machines it is desired to control to a very close degree the position of the web material so that the information printed on the web material will be in substantially the same place on each package made in order to provide appealing and consistent packages. If the position of the web material is not controlled, it is necessary to have two repeats of the same printing for each package length of web material which results in smaller printing on each package and random spacing of the printed information. In terms of the trade the control of the position of the printed information is referred to as "registered print." In the first-mentioned tetrahedron forming machine above, registered print can be maintained by shortening or lengthening the stroke of the advancing mechanism but no successful system had been evolved to maintain registration where the motion of the advancing mechanism is uniform and continuous.

It is therefore an object of this invention to provide apparatus and method to maintain registration of the print on a machine producing tetrahedron packages which uses a continuous uniform web material advancing mechanism and to indicate when the registration system is beyond its limit to control.

Another object of the invention is to provide a method and apparatus to produce a plurality of filled tetrahedron packages on which the printing on the outside surface of each is in substantially the same position on each tetrahedron package.

Other objects and advantages of my invention will become readily apparent as the specification proceeds to describe the invention with reference to the accompanying drawings, in which:

FIG. 1 is a schematic representation of a continuous uniform web material advancing mechanism tetrahedron forming machine;

FIG. 2 is a schematic representation of a tetrahedron package illustrating the principles of the invention;

FIG. 3 is a top view of the new and novel tube forming mechanism which provides control of the position of the printing on a completed tetrahedron package;

FIG. 4 is a schematic representation of the control circuit for the tube forming mechanism shown in FIG. 3, and FIG. 5 is a schematic representation of the registration alarm and indication system.

As is well known in the art, filled tetrahedron containers can be formed from a web of polyethylene coated paper stock. The paper stock is fed to a packaging machine, such as that shown in FIG. 1, wherein it is first formed into tubular shape by a forming ring so that the longitudinal edges of the web material overlap one another. A filling pipe is inserted into the tubular shaped web material just above a heat sealing apparatus which seals the longitudinal seam of the tubular sheet material. Then a set of opposed heat sealing jaws are located below the forming ring and come together to flat press and seal a portion of the tubular sheet material to form a transverse seal. After the transverse seal is formed by the jaws, material to be packaged is supplied into the fill tube and into the tubular sheet material above the transverse seal. When the prescribed amount of material is supplied into the tubular material the material is advanced downwardly where a second set of opposed heat sealing jaws come together to flat press and form a second transverse seal above the material supplied to the tubular sheet material to complete the filled package. The second set of sealing jaws are 90° out of phase with the first set of sealing jaws so that the second transverse seal is preferably substantially perpendicular to the first transverse seal. Then the filled package is further advanced and severed in the center of the second transverse seal to separate the completed package from the web of tubular shaped material.

Looking now to FIG. 1, a typical tetrahedron forming machine is shown which forms tetrahedron shaped filled containers from a roll of polyethylene coated paper stock 10. The paper 10 is supported on a suitable support 12 and is delivered upwardly over a guide roll 14 supported by frame members 16 and 18 secured to the casing 20 of the machine. The paper is delivered downwardly through a V-shaped member 22 which bends the longitudinal edges of the sheet material toward one another. From the member 22 the sheet material passes through a forming ring 24 wherein the overlap of the longitudinal edges is completed so that the elongated heater 26 can seal the edges together of the overlap longitudinal seal. A fill pipe 28 is located within the tubular sheet material and extends downwardly to a point above the first transverse seal formed in the tubular sheet material to supply material to be packaged. To form the first and second transverse seals 30 and 32 (FIG. 2) two sets of endless chains are continuously and uniformly rotated by sprockets 34. One set of endless chains is represented by reference numerals 36 and 38 while the other set of chains (not shown) is located perpendicular to the first set of chains 36 and 38. As shown heating jaws 40 on the first step of chains forms the first transverse seal 30 and simultaneously advances the tubular sheet material. The heating jaws 40 are spaced two packages from one another so that the heating jaws on the second set of chains can form the second transverse seal since they are located between and 90° out of phase with the heating jaws 40. It can be seen that the heating jaws being continuously rotated will form the first transverse seal 30, allow the filling material from the fill pipe to be supplied, form the second transverse seal and supply the packages to a cutting means 42, schematically represented, wherein the transverse seals are severed in the middle to form individual packages.

As discussed previously, it has been very difficult to maintain registered print in a tetrahedron forming machine which operates continuously and has the sealing jaws fixed in relation to one another. In a tetrahedron package, as shown in FIG. 2, the vertical distance "A" is less than the net length of paper between the transverse seals 30 and 32 since the transverse seals are formed alternately at right angles to each other. The net length of the paper between the transverse seals is a function of the diameter or perimeter of the tubular shaped sheet material from which it is formed. As the diameter or perimeter of the tubular shaped sheet material decreases, the net length of the paper approaches the vertical distance "A" and conversely, the net length of the paper increases as the diameter or perimeter of the sheet material increases. FIG. 2 illustrates this principle since it shows that when the diameter or perimeter of the tubular sheet material is large, as indicated by the length "B" of the transverse seal 30, a package, indicated in solid lines, is obtained which has a net wall length 43 which is longer than the net wall length 44 of the package shown in phantom lines made from a section of tubular sheet material which had a reduced diameter or perimeter indicated by the transverse seal length "C". Thus, it can be seen that the net length or amount of paper in each tetrahedron package can be controlled by controlling the diameter or perimeter of the tubular sheet material from which the package is formed.

To accomplish the above function the forming ring 24 shown schematically in FIG. 1 is constructed as shown in FIG. 3 and consists basically of a base plate 46, a forming member 48 rigidly attached thereto and a slidably mounted forming member 50 which cooperates with the forming member 48 to control the amount of overlap of the longitudinal edges of the sheet material to control the diameter and perimeter thereof. It should be noted that in the preferred form of the invention the tubular shape of the sheet material is more eliptical than cylindrical and therefore the opening in the forming ring 24 is elliptical to shape the sheet material. Thusly, the opening 52 in the fixed forming member 48 is elliptical and the arcuate portion 54 in the member 50 which slides in the guide members 56 has a minor axis the same length as the minor axis of the opening 52 and the same radius of curvature. Rotably secured in a suitable support 58 attached to the base plate 46 is an idler guide roll 60 to aid in guiding the tubular sheet material through the opening 52. The groove 62 in the guide roll 60 has a radius of curvature substantially equal to that of the end portion of the opening 52.

To vary the size of opening 52 a lever arm 64 is pivotally secured at one end to the base plate 46 and pivotally secured at the other end to the piston rod 66 of a double acting piston 68 secured to the forming ring 24 by a suitable support 70. A connecting link 72 is pivotally secured to lever arm 64 and to the sliding forming member so that pivotal movement of the lever arm 72 will move the member 50 in and out depending on the direction of movement of the lever arm.

OPERATION

For purposes of detection by the photocell 74, spaced indicia 76 is printed on the paper material 10 so that adjacent indicia are spaced from one another a distance equal to the theoretical amount of paper to produce two tetrahedrons. Looking at the control diagram, it can be seen that when four way valve 78 is not energized (full line position) air is supplied through conduit 80, valve 78 and through conduit 82 into the left hand side of air cylinder 68 to cause the lever 64 (FIG. 3) to be pushed to the full line position at the right to slide forming member 50 to the right, opening the opening in the forming ring 24 to minimize the amount of tube overlap and thereby produce large tetrahedrons. At the same time air is exhausted through conduit 84, valve 78 and conduit 86. A bleed or flow control valve 88 is provided in conduit 86 to bleed the air from the cylinder 68 to prevent sudden reversals of the piston head 90 due to actuation and deactuation of the solenoid 92 which causes a change of position of the four-way valve 78.

The control is basically controlled by two cams 94 and 96 which rotate in synchronism with the travel of the web material 10. The cam 94 pre-sets the whole detection circuit through switch 98 and allows cam 96 to control the passage of a detected signal from the amplifier 100 to the solenoid 92 by controlling the position of switch 102. Each of the cams 94 and 96 have dwell surfaces 104 and 106, respectively, and actuation surfaces 108 and 110, respectively. Connected to switches 98 and 102 are actuation member 112 and 114, respectively, which are connected to followers 116 and 118 which ride on the surface of the cams. As pointed out before, the cams 94 and 96 are synchronized with one another so the switch 98 will assume the solid line position to pre-set the control circuit so that when switch 102 assumes the solid line position a detected signal will be delivered to the solenoid valve 92 and the relay coil 120 will lock in the relay 122 to maintain the solenoid energized until switch 102 breaks contact.

Assume, for the sake of discussion, the cams 94 and 96 are in the position shown with switch 98 in the solid line position. Cam 96 has just rotated to the position where the follower 118 has dropped onto the actuation surface 110 pulling switch 102 into the solid line position, thereby de-energizing relay coil 120 which opens relay switch 122 to de-energize the solenoid coil 92. The valve 78 then assumes the solid line position so that air is supplied to the left hand side of the piston 68 through conduits 80 and 82 while air is being exhausted from the right hand side of the piston through conduits 84, 86 and valve 88. In this position the forming members tend to form larger tetrahedrons with a smaller amount of overlap of the longitudinal seam.

Then as the cams 94 and 96 continue to rotate in the clockwise direction, as indicated, follower 118 will ride up on the dwell surface 106 to cause switch 102 to assume the dotted line position and follower 116 will drop onto the actuation surface 108 and close switch 98 thereby putting the amplifier 100 in the circuit with switch 102. Then, since switch 98 is closed, the momentary relay 124 of the amplifier is in operative relationship with photocell 74 to receive a signal therefrom. If the photocell scans the indicia 76 and it is in the pre-selected position a signal will be sent to the relay 124 which will momentarily close to energize the relay coil 120 to pull in the relay 122 energizing the solenoid 92 to cause the valve 78 to assume the dotted line position whereby air will be supplied to the right hand side of piston 68 and exhausted from the left hand side through conduit 86. This will cause the piston rod 66 to move to the left causing lever 64 to move to the left sliding forming ring 50 to the left and causing the forming ring diameter to be reduced, thereby increasing the amount of tube overlap to reduce the effect net length of the paper in the package formed later. The solenoid 92 will stay energized until cam 96 does a complete rotation and the follower once again drops onto the actuation surface 110 to move the switch 102 to the solid line position to de-energize the relay coil 120 which drops out the relay 122 and de-energizes the solenoid 92 to once again allow the valve 78 to move to the solid line position. This results in air being supplied to the left hand side of the piston 68 and exhausted from the right hand side of the piston thereby moving the forming ring 50 outwardly to decrease the amount of tube overlap to increase the net effective length of paper in later formed tetrahedrons. It can be seen that if the indicia is not in the preselected position that air will continue to be supplied to the left hand side of the piston 68 causing larger tetrahedrons to be produced until the photocell once again detects proper location of the indicia 76.

Looking at FIGS. 4 and 5 it can be seen that the coil 126 is in parallel with the coil 120 so that whenever the coil 120 is energized, the coil 126 is energized to make or close the switches or relays 130 in the alarm circuit shown in FIG. 5 thereby energizing timers 132 and 139. Power is supplied to the circuit through a suitable transformer 128 whenever the machine is in the turn position.

When the coil 126 is energized, the forming ring diameter is being reduced thereby increasing the amount of overlap of the tube. At the same time the timer 132 is activated to start timing while the capacitor 134 is being charged. Timer 139 is also activated to open switches or relays 146 and 148. The timers 132 and 139 are so selected to time out on the passage of time equivalent to about ten cycles of the machine with a cycle of the machine being basically the time between the passage of adjacent indicia 76 past a fixed point. As pointed out above, when follower 118 drops into the dwell 110 of cam 110, the coil 120, as well as coil 126, will be de-energized but the timer 132 will continue to be energized through charge on the capacitor 134. Then if the photocell 74 continues to require the energization of coils 120 and 126 for ten cycles or a certain predetermined time, the timer 132 will time out and close the switches or relays 136 and 138 to energize the light 140 and the audible alarm 144 to indicate to the operator that the machine is not maintaining registration and the forming ring is not closing sufficiently to maintain registration.

Conversely, if the coils 120 and 126 are not energized, the switch or relay 130 will be open and the timer 139, which times out on deenergization, will start to time out. If the coil 126 is not energized for ten machine cycles or some other predetermined time, the timer 139 will time out and close switches 146 and 148 to energize the light 142 and the audible alarm 144 to indicate to the operator that the machine is out of registration and that the forming rings are open. It must be kept in mind that timer 139, once energized by the making of switch or relay 130, maintains the switches or relays 146 and 148 open until the pre-selected amount of time passes. Thus, it can be seen that neither of the timers 132 or 139 can turn on the alarm system unless ten machine cycles or other pre-selected time has passed.

It can thus be seen that I have provided a method and apparatus to maintain registered print by scanning indicia printed on paper stock to control the amount of overlap of the tubular material being made into individual filled tetrahedrons and to indicate when the registration system is beyond its limit of control.

While the method and apparatus described herein constitutes the preferred form of the invention, it will be understood that the invention is capable of modification without departing from the spirit of the invention.

That which is claimed is:

1. A method to provide registered print on a carton forming machine comprising the steps of: supplying a roll of carton stock material with spaced indicia thereon, forming said paper stock into a tube, detecting the position of said indicia on said stock material, changing the perimeter of said tube if said detected indicia is in a predetermined position and providing a signal to an operator if the machine attempts to either decrease or increase the perimeter of the tube for a period greater than a predetermined time.

2. The method of claim 1 wherein the signal produced tells whether the tube perimeter is being decreased or increased.

3. Apparatus to form filled containers comprising: means to supply a container stock material, said material having spaced indicia printed thereon, means to form said stock material into tubular shape, heating, sealing and filling means operably associated with said apparatus to flat press and fill said tubular shaped stock material to form filled containers, means to continuously and uniformly advance said tubular spaced shaped stock material, means to sever said filled containers from said tubular shaped stock material, means to vary the position of the indicia of the stock material by varying the perimeter of the tubular shaped stock material and means to signal the operator when the perimeter is either increased or decreased continuously for a certain predetermined time.

* * * * *

UNITED STATES PATENT OFFICE
CERTIFICATE OF CORRECTION

Patent No. 4,067,170  Dated January 10, 1978

Inventor(s) Robert V. Yates, Jr.

It is certified that error appears in the above-identified patent and that said Letters Patent are hereby corrected as shown below:

Column 2, line 45, insert the word --the-- between "shown" and "heating".

Column 2, line 45, delete the word "step" and substitute therefor --set--.

Column 4, line 13, delete the word "member" and substitute therefor --members--.

Column 5, line 13, delete the word "turn" and substitute therefor --run--.

Column 6, line 38, delete the word "spaced".

Signed and Sealed this

Sixth Day of June 1978

[SEAL]

Attest:

RUTH C. MASON
*Attesting Officer*

DONALD W. BANNER
*Commissioner of Patents and Trademarks*